(12) United States Patent
Mahe et al.

(10) Patent No.: US 8,762,449 B2
(45) Date of Patent: Jun. 24, 2014

(54) METHOD OF DOWNLOADING LARGE SIZE DATA TO A LARGE NUMBER OF NETWORKED CLIENT MACHINES FROM A SINGLE SERVER

(75) Inventors: Aubin Mahe, Saint-Médard-d'Eyrans (FR); Nicolas Chaignon, La Teste-de-Buch (FR); Pierre Harambillet, Bordeaux (FR)

(73) Assignee: Thales, Neuilly sur Seine (FR)

( * ) Notice: Subject to any disclaimer, the term of this patent is extended or adjusted under 35 U.S.C. 154(b) by 973 days.

(21) Appl. No.: 12/788,572

(22) Filed: May 27, 2010

(65) Prior Publication Data

US 2010/0306311 A1 Dec. 2, 2010

(30) Foreign Application Priority Data

May 29, 2009 (FR) ...................................... 09 02611

(51) Int. Cl.
*G06F 15/16* (2006.01)
(52) U.S. Cl.
USPC ........... 709/203; 709/219; 709/231; 707/823; 707/827
(58) Field of Classification Search
None
See application file for complete search history.

(56) References Cited

U.S. PATENT DOCUMENTS

| | | | |
|---|---|---|---|
| 6,115,750 A | 9/2000 | Dillon et al. | |
| 6,233,252 B1* | 5/2001 | Barker et al. | 370/473 |
| 6,473,749 B1* | 10/2002 | Smith et al. | 707/784 |
| 6,879,808 B1* | 4/2005 | Nations et al. | 455/12.1 |
| 8,370,403 B2* | 2/2013 | Matsuki | 707/821 |
| 8,392,530 B1* | 3/2013 | Manapragada et al. | 709/219 |
| 2007/0276925 A1* | 11/2007 | La Joie et al. | 709/219 |
| 2009/0248794 A1* | 10/2009 | Helms et al. | 709/203 |
| 2009/0307307 A1* | 12/2009 | Igarashi | 709/203 |
| 2010/0094972 A1* | 4/2010 | Zuckerman et al. | 709/219 |

OTHER PUBLICATIONS

"The MD5 Message-Digest Algorithm", MIT Laboratory for Computer Science and RSA Data Security, Inc., Ronald L. Rivest, Cambridge, MA, Apr. 1992, Online—http://www.ietf.org/rfc/rfc1321.txt—retrieved May 27, 2010.

* cited by examiner

*Primary Examiner* — Mohamed Ibrahim
(74) *Attorney, Agent, or Firm* — Baker Hostetler LLP

(57) ABSTRACT

The present invention exploits the multiple-broadcast capabilities of networks associated with a reliable connection-oriented protocol. The inventive method allows a file to be transferred only once. The data, which represent a large volume of information, use multiple-broadcast channels, whereas the interchanges relating to the control of the quality of the communication use a reliable medium in connected mode. In order to eliminate the unnecessary transfers (network) and activity (server and client), a calculation worked out from all of the file data is performed to identify it definitely.

10 Claims, 2 Drawing Sheets

METHOD OF DOWNLOADING LARGE SIZE DATA TO A LARGE NUMBER OF NETWORKED CLIENT MACHINES FROM A SINGLE SERVER

CROSS-REFERENCE TO RELATED APPLICATIONS

This application claims priority to foreign France patent application No. 0902611, filed on May 29, 2009, the disclosure of which is hereby incorporated by reference in its entirety.

FIELD OF THE INVENTION

The present invention relates to a method of downloading large size data to a large number of networked client machines from a single server.

BACKGROUND OF THE INVENTION

The systems used in the field of file transfer with no size limit in a strongly distributed IP network environment generally consist of a source server terminal and numerous target client terminals connected by "switches" and/or routers.

FIG. 1 diagrammatically represents a system of the type of that to which the invention applies. In such a system, a server 1 has a file 2 that has to be transferred via a transmission network 3 to a set of clients 4 which store this file on a corresponding disk, all the duly stored files being referenced 5. In this diagram, in the interests of the clarity of the drawing, the switches and/or routers that are part of the network 3 are not represented.

The downloading of the information must be done as quickly as possible, reliably, while reducing network usage time and avoiding unnecessary transfers.

The current FTP solutions, ssh/scp, propose a transfer time that is proportional to the number of clients. By using a machine tree structure comprising distinct network strands, the transfer times are proportional to the base 2 logarithm of the total number of machines: $t = tu \times \log_2(N)$, with t being the total time to load all the target machines, tu the time to transfer a file from point to point and N the number of target machines. This remains insufficient in usage contexts in which the unavailability time of the computer system is costly (civil avionics) or directly linked to the safety of individuals (health, defence).

There are faster solutions which use connectionless protocols and broadcast addresses, but they do not guarantee that the data sent will be received and do not propose retransmission mechanisms. Their lack of reliability confines them to niche applications.

When the files already exist on the targets, it is necessary to determine whether they are up to date or whether a new version of these files must be transferred; there is no reliable file comparison, prior to transfer, incorporated in the existing protocols. Unnecessary transfers are therefore commonplace.

The retransmission for each client of the same information means that, as seen from the network, the file transits a large number of times, which means mediocre performance and computer security issues.

SUMMARY OF THE INVENTION

The subject of the present invention is a method of downloading large size data, for example of a few hundred Mb, to a large number of networked client machines from a single server, said method reducing the network usage time and avoiding unnecessary transfers, with the shortest possible transfer times, and guaranteeing that the data sent will be received, while proposing retransmission mechanisms and providing good computer security. Another subject of the present invention is a system for implementing this method.

The method according to the invention is characterized in that it consists in transmitting the large size files over a multiple-broadcast medium, and the control information over a reliable point-to-point link.

According to one advantageous characteristic of the invention, the control information comprises information relating to the control of the quality of reception of the files, information data relating to the files transmitted by the server, the reception balance of each connected client, the validity of the local reconstruction of the file, and of the client acknowledgements.

According to another characteristic of the invention, the protocol for broadcasting over broadcasting media is of MCastFTP type.

BRIEF DESCRIPTION OF THE DRAWINGS

The present invention will be better understood from reading the detailed description of an embodiment, taken as a nonlimiting example and illustrated by the appended drawing in which.

DETAILED DESCRIPTION

The present invention is described in detail hereinbelow with reference to the broadcasting of video on demand (VOD), but obviously it is not limited to this application, and it can be implemented in different applications requiring the transmission of large information flows (for example files of at least several hundred Mb) between a multiple-broadcast medium and a reliable point-to-point link. This broadcasting is done by a server, comprising at least one computer, to several (at least three, but this number can even be greater than 100) client computers. An example of one application may be the broadcasting of video on board an aircraft.

Figure 1:
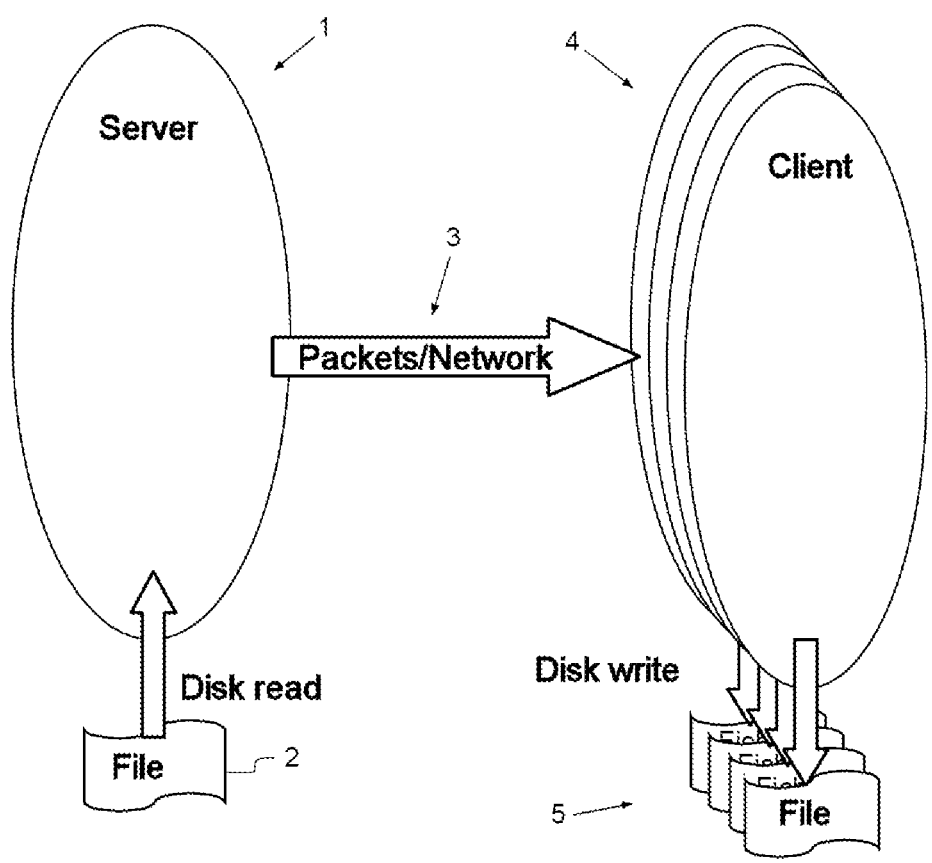
FIG. 1 is a simplified block diagram of a known system in which the invention can be implemented.
Figure 2:
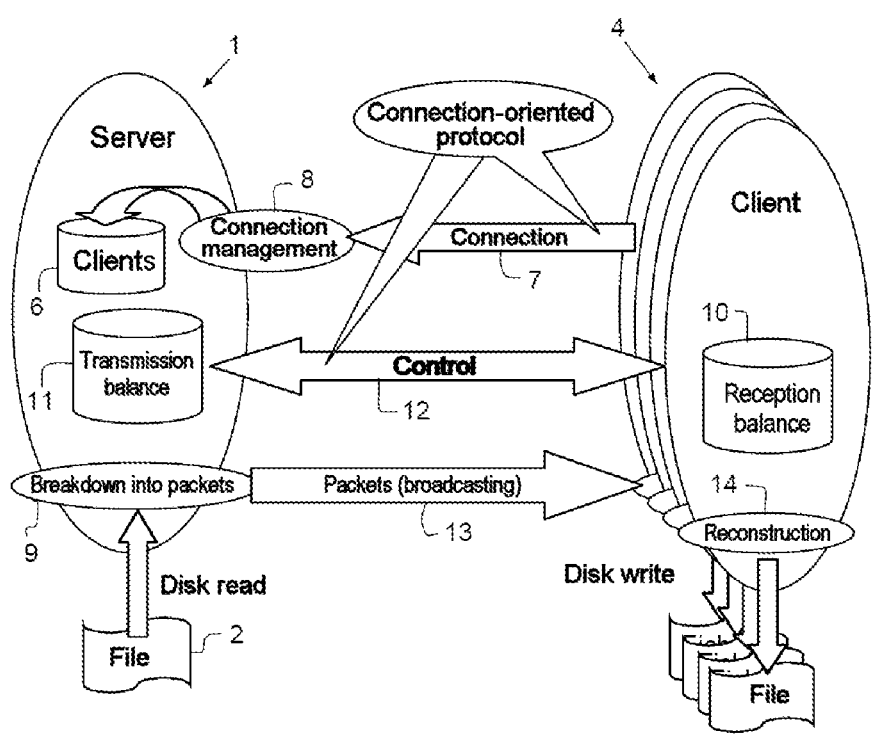
FIG. 2 is a simplified block diagram of a system for implementing the method according to the present invention.

The system according to the invention and diagrammatically represented in FIG. 2 is similar to that represented in FIG. 1, the same elements or similar elements being assigned the same numeric references. The difference between these two systems lies essentially in the process for transmitting files (by multiple broadcast) and control information via different transmission means, this control information being transmitted by a reliable point-to-point link, and being in particular information relating to the control of the quality of the reception of the files, as described in detail hereinbelow.

The server 1 has the list 6 of all its potential clients 4 and manages it in real time so as to know which clients are connected (subset of the list 6). It uses point-to-point transmission to inform these clients of the imminent transmission of a file 2. Each connected client can check, by means of control data, which in this case are information data relating to the file 2 to be broadcast and transmitted by the server, the real need for updating of the file 5 that it has received previously. The server uses a conventional multiple-broadcast network to transmit these data in packets of fixed length (13), at a controlled bit rate, by means of a broadcasting protocol (for example, according to the MCastFTP protocol which can be a combination of the TCP and UDP protocols). The length of the packets transmitted in this way is determined in a way that is obvious to those skilled in the art upon reading the present description, because it depends on the quality of the physical medium handling the transmission and the number of retransmissions needed for the largest possible number of clients to be able to receive all the expected files. This packet length is fixed for at least each transmitted file, but can be dynamically adjusted for each subsequent file if the transmission conditions vary over time, but this requires a question/answer communication between the server and the clients via the connected links, which are reliable. Generally, the better a link is, the more preferable it becomes to transmit large packets because, when the packets are too small, the protocol uses too much data for its synchronization to the detriment of the useful data.

The clients receive the data, reconstruct (14) the file from these packets, and establish a running balance of the data losses (10) from the file. At the end of transmission of the file, the server 1 obtains the reception balance from each connected client using the connection-oriented protocol (12). The server combines the balances (11) and thus determines the packets to be retransmitted. The retransmission follows the same principle as explained previously. When a client has all the packets, it checks the validity of the local reconstruction of the file (14) and sends the result by means of the connection-oriented protocol for the attention of the server. When all the clients have received the file, the server is once again ready to send another file. So as to guarantee overall effectiveness, timers at the various stages of the protocol are armed to eliminate the clients that are unable to observe the protocol (too slow, faulty, etc.).

An example of an application is described hereinbelow in which a user wants to update a set of digital videos on several servers of said user, for example on about ten VOD (Video On Demand) servers (not represented in the drawing). It then sends a connection request (7) according to a connection-oriented protocol, for example TCP for IP networks. This request is processed in the server 1 by a connection-management application 8, and the server identifies this user using its list 6 of clients.

A dedicated application of the server 1 (known per se) is then used to place the films (cut up on the fly) in a determined directory 9 on the server. We will assume that the network and the routers are operational, that the participating MCastFTP software (clients and server) has been started up and that the software is on standby.

The user indicates, to the MCastFTP server, the list of the files to be distributed to its own VOD servers (set 4). Initially, the MCastFTP participants (clients and server) establish their connections, then the server 1 sends (in connected mode) a notification of the imminent start of transmission containing the name of the file, its size and its MD5 checksum (MD5 standing for "Message Digest 5", explained in: http://www.ietf.org/rfc/rfc1321.txt), and the clients must acknowledge receipt of this notification. Under the control of a timer R1, the reception acknowledgements from the clients are routed to the server via the network using the point-to-point connections of this network. The clients that have not acknowledged receipt within an allotted time are eliminated from this transfer, but they will be contacted for the next transfer. An MCast-FTP client can acknowledge in two different ways: either it already has this file, in the version of the server, checked by MD5, and in this case it acknowledges in the negative, or it does not have it, or not in the requisite version, and it acknowledges positively. The value of the timer R1 must take into account the time required for the MD5 calculation, which is not inconsiderable on very large files (>2 Gb for example).

The server 1 subsequently strings together the sending of packets of fixed size (this parameter must be adjusted to the network capabilities, in a manner known per se), numbered, over the broadcasting medium (UDP for IP networks) and the acknowledgements from the clients are received by means of the point-to-point connections of the network 3. The wait for the acknowledgments is limited by a timer R2. The clients write the received packets into a local file at a location calculated on the basis of the index of the packet (its rank in the set of packets to be transmitted). The position of the missing or errored packets is therefore reserved and filled with zero or random values depending on the file system used. Once the sending of the file is finished, the server recommences with the packets lost by at least one client (it is observed on IP networks that localized losses are rare, usually 30 to 50% of the clients are affected, so retransmission therefore remains effective over a broadcasting link rather than in point-to-point mode), until completion. The clients for which no acknowledgement is returned are eliminated from the transfer of this file, and they will be contacted upon the transmission of the next file.

At the end of reception of the file, each client calculates the MD5 sum, compares it and returns it to the server, and does so during the time period allotted by the timer R1.

The subsequent files are processed in the same way. At the end of the transfer of all the files, the MCastFTP server 1 knows the state of the transfers of all the clients. Said server uses a management information system, consisting of the list of the clients, their state (reachable or not, responsive or not), the list of the files successfully transmitted and the list of the files for which the transfer has failed and the reason for each failure displayed to the user, to decide whether to relaunch the operation until completion if the observed faults are transient.

Thus, by exploiting the multiple-broadcast capabilities of the networks associated with a reliable connection-oriented protocol, the method according to the invention can be used to transfer a file just once. The data, which represent a large volume of information, use the multiple-broadcast channels, whereas the interchanges relating to the control of the quality of the communication use a reliable medium in connected mode. In order to eliminate the unnecessary transfers (network) and activity (server and client), a calculation worked out over all the data of the file is performed to identify it definitely. After the identifier has been propagated, each client informs the server of the real need for transfer. This drastically reduces the file transfer time, which is proportional to the size of the file, and not proportional to the number of clients.

The transfer time is then calculated as follows:

$$T = T_f \cdot F_c \cdot (1 + p_s + p_r + p_c)$$

with: T being the time to transfer the file
$T_f$ being the time to transfer a packet
$F_c$ being the number of packets in the file
$p_s$ being the probability of packet loss in transmission: saturation of the packet queue, collisions, etc.
$p_r$ being the probability of packet loss by the network: links, routers, bridges, etc.
$p_c$ being the probability of packet loss by a client: inability to unstack the packets quickly enough, bottlenecks in the file reconstruction and disk writing subsystem, etc. This probability highlights the impact of the number of clients on overall performance.

It will be noted that, in practice, on an IP network, the term $(1+p_s+p_r+p_c)$ is very much less than $F_c$, which confirms that the transfer time is proportional to the size of the file (number of packets).

What is claimed is:

1. A method of transmitting a large size file to multiple networked client machines from a single server, the method comprising:

transmitting the large size file over a multiple-broadcast medium from the single server to the multiple networked client machines; and transmitting control information relating to the large size file over a reliable point-to-point link from the single server to the multiple networked client machines, the reliable point-to-point link being different from the multiple-broadcast medium, wherein the control information comprises information relating to quality control of reception of the large size file, information relating to the large size file transmitted by the single server, a reception balance of each connected client machine, validity of local reconstruction of the large size file, and client machine acknowledgement of receipt of the large size file, and wherein a transfer time of transmitting the large size file over the multiple-broadcast medium from the single server to the multiple networked client machines is determined according to:

$T=T_f F_c \cdot (1+p_s+p_r+p_c)$, wherein:

T is the transfer time, $T_f$ is a time to transfer a single packet, $F_c$ is the number of packets necessary to transfer the large size file, $p_s$ is a probability of packet loss due to transmission variables, $p_r$ is a probability of packet loss due to multiple-broadcast medium variables, and $p_c$ is a probability of packet loss due to networked client machine variable.

2. The method according to claim 1, wherein the protocol of the multiple-broadcast protocol medium is packet-based.

3. The method according to claim 2, wherein the multiple networked client machines reconstruct the large size file from the packets received, establish a running balance of data losses from receipt of the large size file, and acknowledge receipt of the large size file to the single server.

4. The method according to claim 3, wherein the multiple networked client machines that have not acknowledged receipt of the large size file to the single server within an allotted time are eliminated from transmittal of the large size file over the multiple-broadcast medium and are contacted for a future transmittal of the large size file.

5. The method according to claim 3, further comprising:

receiving, at the single server, at least one connection request from a networked client machine requesting transmittal of the large size file; and forwarding, from the single server to the networked client machine, a notification of imminent start of transmission, the notification comprising the name of the large size file, the size of the large size file, and a checksum of the large size file.

6. The method according to claim 1, wherein each networked client machine acknowledges receipt of the large size file to the single server by forwarding a negative acknowledgement if the networked client machine already has the large size file or forwarding a positive acknowledgement if the networked client machine does not have the large size file.

7. The method according to claim 1, wherein the protocol of the multiple-broadcast medium is of MCastFTP type.

8. The method according to claim 1, wherein the single server transmits, for each large size file, a MD5-type checksum.

9. The method according to claim 1, further comprising determining whether the networked client machine already has the large size file.

10. A computer system for transmitting a large size file to multiple networked client machines, wherein the computer system comprises one or more processors coupled to a storage device, the system being configured to:

transmit the large size file over a multiple-broadcast medium from the computer system to the multiple networked client machines; and transmit control information relating to the large size file over a reliable point-to-point link from the computer system to the multiple networked client machines, the reliable point-to-point link being different from the multiple-broadcast medium, wherein the control information comprises information relating to quality control of reception of the large size file, information relating to the large size file transmitted by the computer system, a reception balance of each connected client machine, validity of local reconstruction of the large size file, and client machine acknowledgement of receipt of the large size file, and wherein a transfer time of transmitting the large size file over the multiple-broadcast medium from the computer system to the multiple networked client machines is determined according to:

$T=T_f F_c \cdot (1+p_s+p_r+p_c)$, where:

T is the transfer time, $T_f$ is a time to transfer a single packet, $F_c$ is a number of packets necessary to transfer the large size file, $p_s$ is a probability of packet loss due to transmission variables, $p_r$ is a probability of packet loss due to multiple-broadcast medium variables, and $p_c$ is a probability of packet loss due to a networked client machine variable.

* * * * *